United States Patent [19]

Schedwin

[11] Patent Number: 4,664,579

[45] Date of Patent: May 12, 1987

[54] ARRANGEMENT FOR TRANSFERRING HEAVY WORKPIECES

[76] Inventor: Sven-Erik Schedwin, Box 8280, Falun, Sweden

[21] Appl. No.: 809,914

[22] Filed: Dec. 17, 1985

Related U.S. Application Data

[63] Continuation-in-part of Ser. No. 531,900, Aug. 24, 1983, abandoned.

[51] Int. Cl.⁴ .............................................. B65H 5/04
[52] U.S. Cl. .................................... 414/223; 104/135; 193/35 TE; 198/346.1; 198/468.9
[58] Field of Search ...................... 414/516, 222, 223; 193/35 TE; 269/289 MR; 198/488, 485, 750, 754, 346.1, 346.2, 468.9; 104/135

[56] References Cited

U.S. PATENT DOCUMENTS 2,613,789 10/1952 McLaughlin .................... 193/35 TE
2,815,849 12/1957 Zumbrunnen .................... 193/35 TE

FOREIGN PATENT DOCUMENTS 5712373  6/1973 Australia .
2615177 12/1978 Australia .
5987780 10/1980 Australia .
0001152  3/1979 European Pat. Off. .
77110856 10/1977 Sweden .
 745649  7/1980 U.S.S.R. .

Primary Examiner—L. J. Poperner
Assistant Examiner—Donald W. Underwood
Attorney, Agent, or Firm—Witherspoon & Hargest

[57] ABSTRACT

The present invention relates to an improved arrangement for transferring heavy workpieces from a transport or storage position to at least one machining position or reverse. According to the invention this is achieved by means of a pair of arms (13) which are telescoptically extendable for bridging the distance between the positions and by means of support apparatus (14, 15) which, in the fully or partly extended position for the arms (13), engage and support the arms adjacent their outer ends.

5 Claims, 5 Drawing Figures

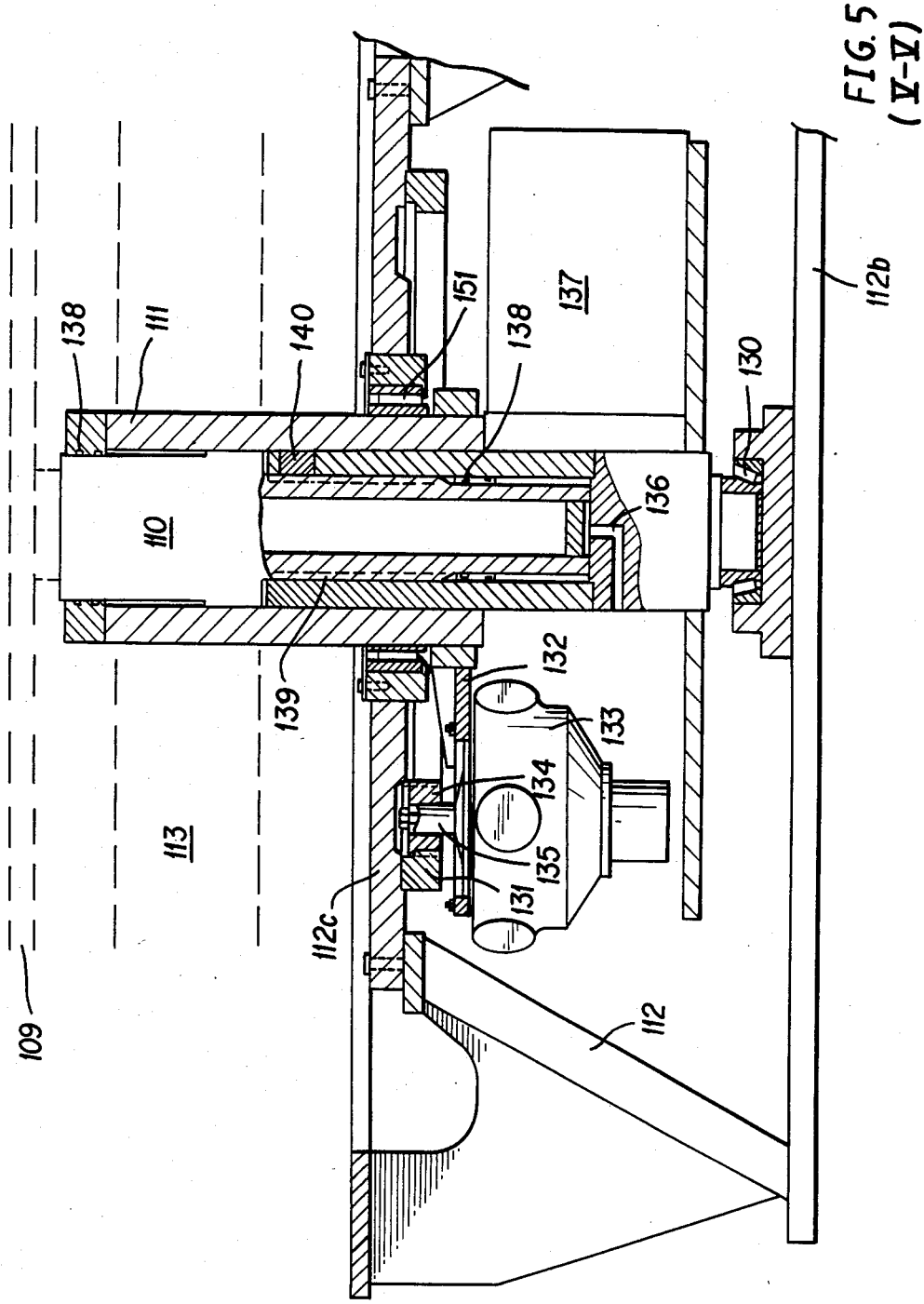

ARRANGEMENT FOR TRANSFERRING HEAVY WORKPIECES

This is a continuation-in-part application of Ser. No. 531,900 filed on Aug. 24, 1983, abandoned.

BACKGROUND OF THE INVENTION

The present invention relates generally to an arrangement for transferring heavy workpieces from a transport or storage position to a working or machining position and reverse, and is especially intended for a pallet changer for transferring heavy workpieces from e.g. a conveyor belt to a machining center and back.

For operation systems with machining centers there does presently exist a great number of solutions regarding pallet handling, but most of these solutions are founded on the same basic principles. Thus, it is usual to start from a pallet storage of a rotary type and usually with 6, 8 or 10 pallets. From this storage the pallets are transferred to the machining center by means of a pallet changer positioned directly adjacent the machining position. The disadvantage of such equipment is that the pallet changer has such a short reach that it can only serve one machining center and consequently there is required for each machining center an equipment according to the above which equipment costs in the order of 200,000 U.S. Dollars.

In order to reduce these costs other arrangements have been developed and in accordance with European patent application No. 78 200 181.2 there has e.g. been suggested to combine the pallet storage and the pallet changer in one unit, but also this arrangement suffers from the disadvantages that it has a very short reach and that it consequently must be positioned close to the machining center to be served. Said arrangement does, as well as the above mentioned arrangements with separate pallet storages and pallet changers, suffer from the disadvantage that it is necessary to decide in advance the exact number of pallets in the pallet storage (as mentioned usually 6, 8 or 10 pallets), and thus the whole pallet storage must be changed if, at a later stage it appears that an increased number of pallets is necessary for a certain manufacturing.

Even if, as indicated above, some efforts have been made to lower the costs for the pallet handling, it has previously not been possible to solve the problem of serving a plurality of processing machines by means of one and the same unit, which solution would bring about a drastic lowering of the costs. It is true that for smaller, lighter details it is possible to use a transferring arm of the industrial robot type in order to supply workpieces for machining, but for workpieces weighing up to 2 tons such a solution is not possible since the transferring arms are too week. Thus, the problem is that by means of the known arrangement it is not possible to simultaneously serve several processing machines when the workpieces weigh in the order of 2 tons or more. The reason for this is that the existing arrangements capable of supporting workpieces weighing 2 tons and more have a relatively short reach which is not at all sufficient for permitting the same arrangement to serve several machines. The space required for the machines makes it necessary for the arrangement to have a capacity to transfer workpieces approximately 3 meters or more between the storage position and the machining position. It is true that a system has been developed according to which an electric trolly, guided by means of electrical circuits laid out in the floor, serves several processing machines from a central storage, but besides the fact that this system involves very high investment costs it also requires a very great floor space at the same time as the flexibility is restricted as regards future changes in the planning of the work shop.

The purpose of the invention is thus to provide an improved arrangement of the kind indicated in the introduction, which arrangement makes it possible to transfer heavy workpieces a rather long distance between a storage or transport position and a machining position and which arrangement in spite of this is relatively cheap. This purpose is achieved by means of an arrangement indicated in the claims, and from the claims the characteristic features of the invention is also clear.

The invention is more closely described below in connection to the enclosed drawings.

BRIEF DESCRIPTION OF THE DRAWINGS

FIG. 5 is a cross-section along the line V—V of FIG. 4, illustrating specifically the hydraulic drive systems for the housing and the table.

DETAILED DESCRIPTION

Figure 1:
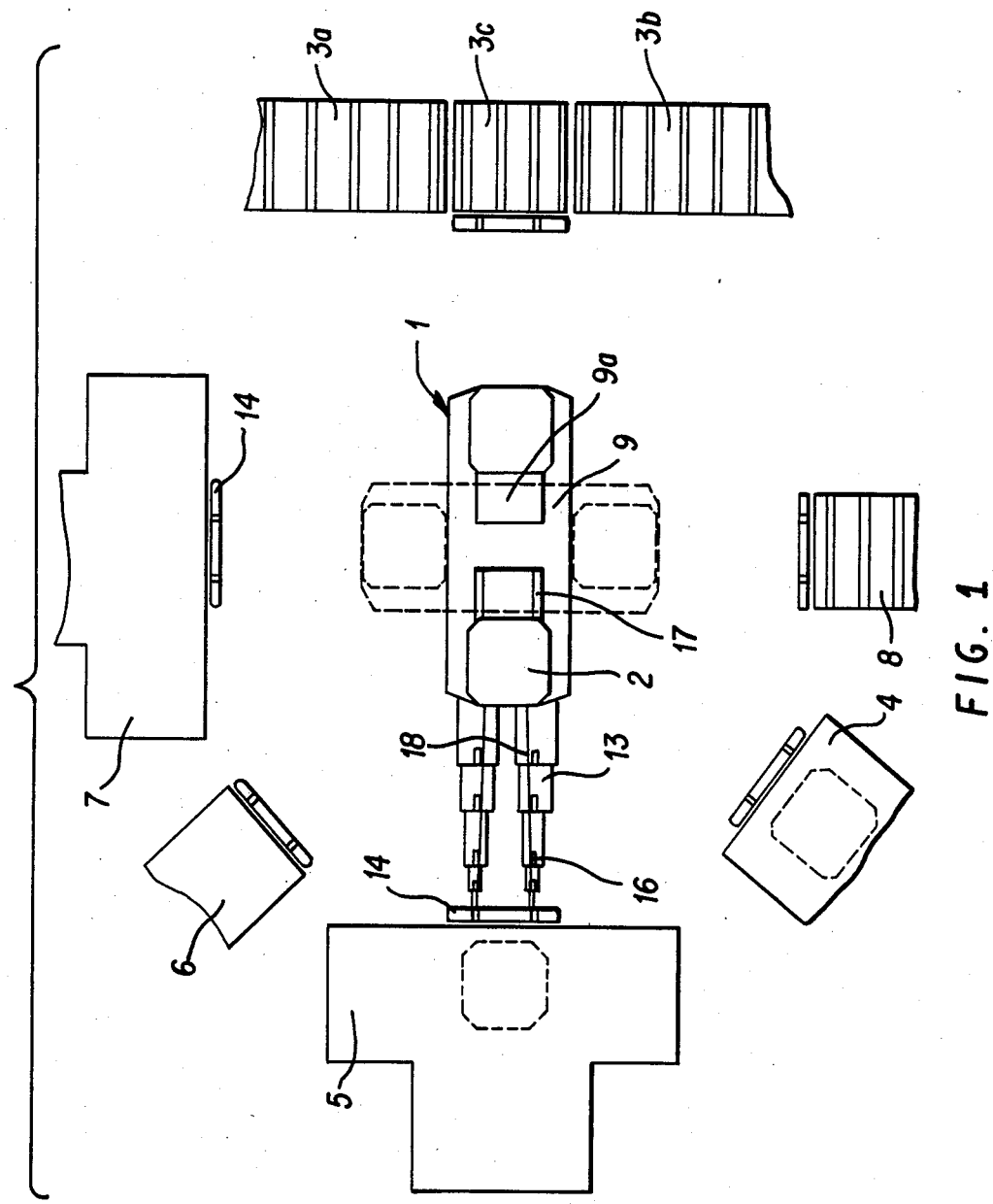
FIG. 1 is a schematic plan view seen from above of an embodiment of the invention included in a manufacturing system comprising several processing units.

In FIG. 1 an embodiment of the invention is illustrated comprising a pallet changer, which generally is designated by the numeral 1, and which for the purpose of exemplification is included in a manufacturing system where pallets 2 through conveyor belts 3a and 3b are fed from setting-up stations and are supplied to a position 3c (may e.g. comprise a rotary table for aligning the workpieces set-up on the pallets from a position suitable for feeding and to a position suitable for the machining or processing) from which the workpieces are fetched by means of the transfer arrangement. By means of this transfer arrangement the pallets fetched from position 3c may then in turn be transferred to a first processing machine 4 which may e.g. be an upright drilling machine (in the case where horizontal machining centers are used which cannot process the upper side of the workpiece), a first machining center 5, a washing station 6, a second machining center 7 and to a conveytor belt 8 for feeding out the finished machine in detail. It should however be clearly understood that the manufacturing system in connection to which the arrangement according to the invention is described simply is exemplifying and should in no sense be regarded as delimiting the invention. Thus, it should be evident that the arrangement according to the invention may be used in any other suitably constructed manufacturing system.

Figure 2:
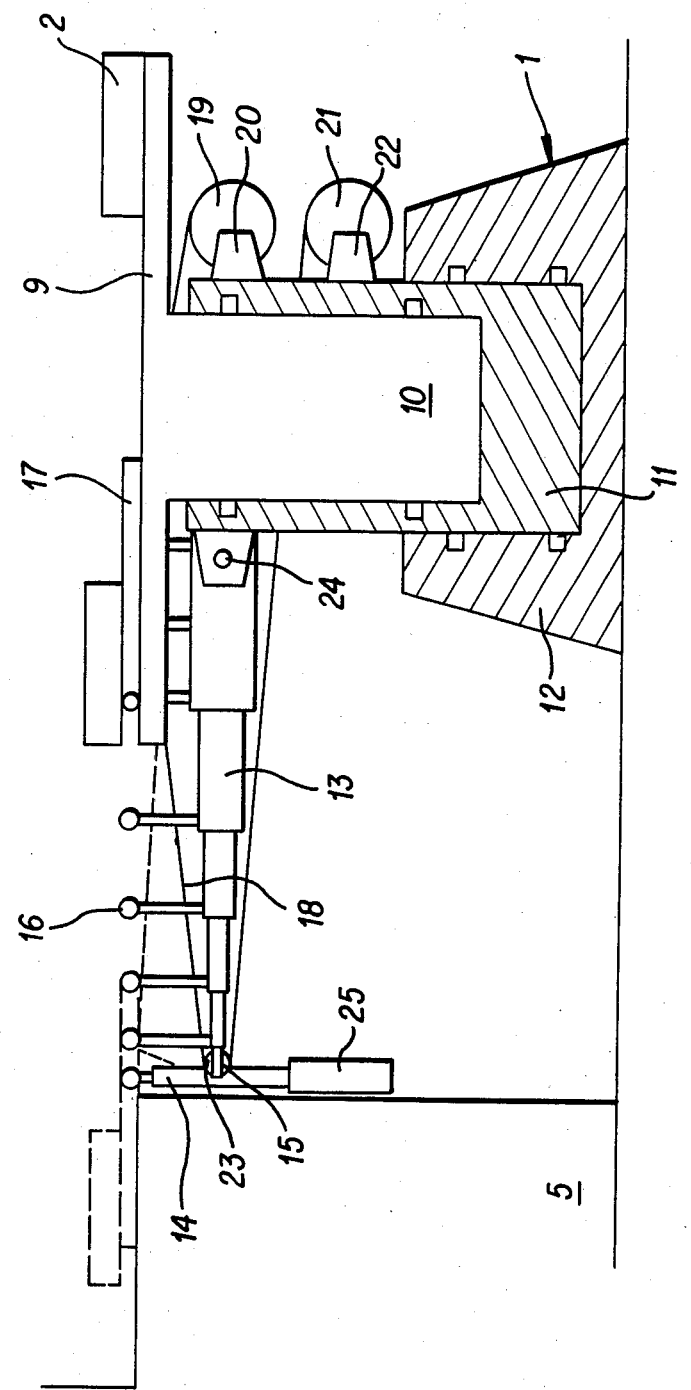
FIG. 2 is a schematic side view, partly in section, of the embodiment according to FIG. 1.
Figure 3:
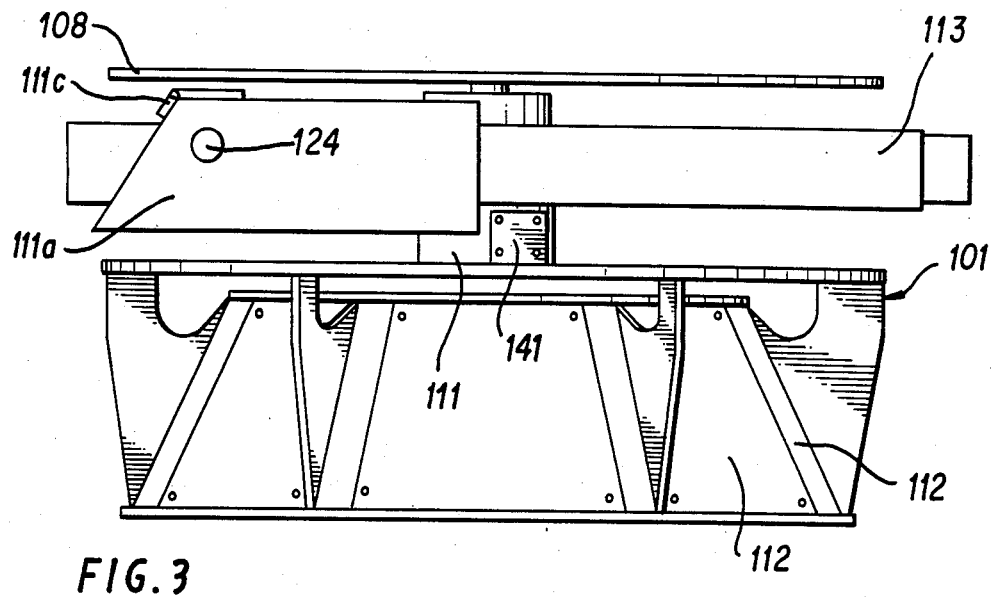
FIG. 3 is a side view of an alternative embodiment of the transfer member according to the invention, with parts, such as carriage, thereof removed for reasons of clarity and for specifically illustrating the mounting of the extendable arms.
Figure 4:
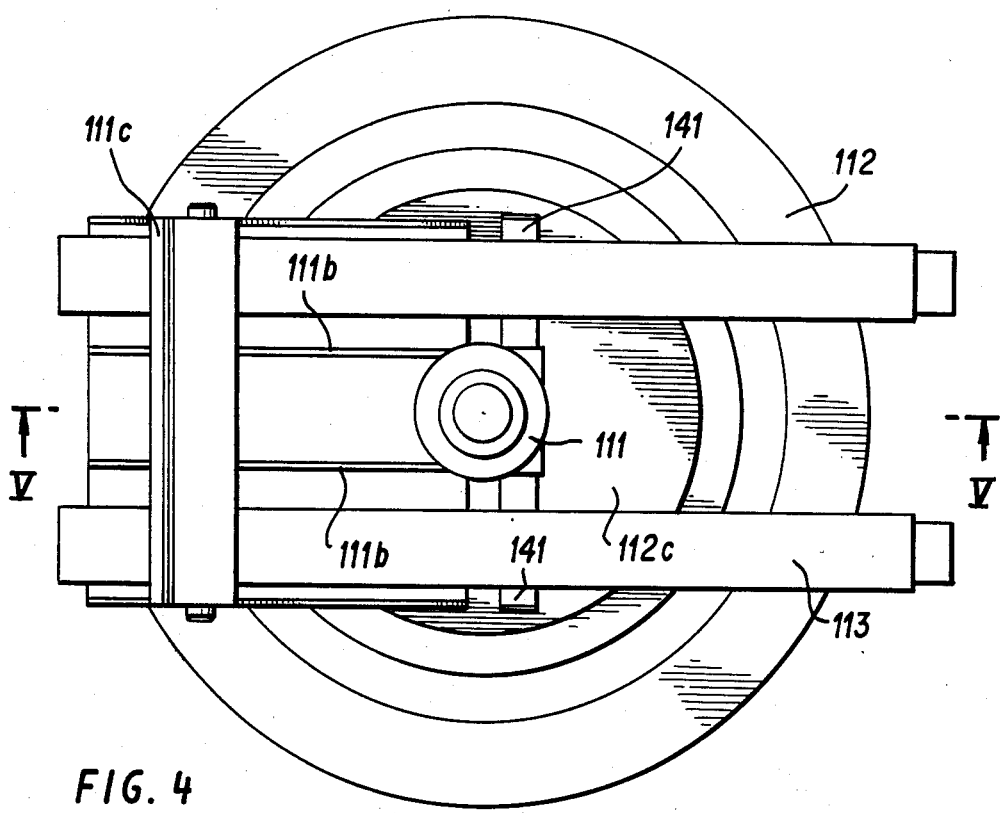
FIG. 4 is a plan view from above of the alternative embodiment of FIG. 3.

From the schematic illustration of FIGS. 1 and 2 it is also clear that the transfer arrangement 1 basically consists of a table 9 on which the pallets 2 are received. The table 9 is in the illustrated embodiment, and seen from above, essentially rectangular in shape and is intended to support two pallets. It is obviously also possible to use other shapes for the table 9, e.g. for supporting more than two pallets, but in most cases this is not necessary and would only make the arrangement more expensive. As is clear from the figures the two pallets are supported close to the short edges of the table 9 and moreover the table (FIG. 2) is provided with a central downwardly directed column 10 by means of which it is journalled in a housing 11 in such a way that it is rotatable over 360 degrees in relation to the housing and that it is vertically adjustable. The driving of the table, for the rotary movement as well as for the vertical adjustment, is typically achieved by means of hydraulic motors (a preferred embodiment is illustrated in FIGS. 3-5). This maneuverability for the table will be described more closely below.

The housing 11 which preferably has a generally cylindrical shape and which surrounds the main portion of the column 10 is in turn rotatably journalled in a base 12 resting on the floor of the work shop or the like. In the upper portion of the housing 11, that is adjacent the table 9, a number of, preferably two, telescopically extendable arms 13 are postioned. In the illustrated embodiment the arms 13 consist of two telescopic cylinders which are single acting, that is which are extended by means of hydraulic fluid but which are retracted mechanically and possibly counteracting a low, continous hydraulic pressure. It is naturally also possible with other configurations for the arms 13 and as examples it can be mentioned that extendable plates in layers on top of each other or arms in the shape of U-beams with stepwise different dimensions, for fitting into each other may be used.

Adjacent each machining position that the transfer arrangement shall serve a support means 14 is arranged which on a level with the arms 13 is provided with recesses 15 which engage the outermost sections of the arms 13 when the arms are fully or partly extended. In this way the arms 13 will, in their fully or partly extended position (depending upon the positioning of the processing machine), form a bridge between the transfer arrangement and the processing machine to be served, and on this bridge the pallets may in turn be transferred to the processing machine in question.

It should be pointed out that within the scope of the invention the support means can be modified in different ways. For example it is possible to provide the support means directly on the processing machine or on the conveyor, as a part thereof, or to arrange the recesses, which engage the outer ends of the arms, directly in the machine or conveyor structure.

For the above mentioned purpose of forming a bridge each section, except that last one, in each arm 13 is adjacent its outer end provided with a roller 16. In the extended position of the arms 13 these rollers do, possibly together with a roller on top of the support means 14, form a track for a carriage 17, independent of table 9. Carriage 17 in its most unsophisticated design includes two interconnected U-beams positioned in such a way that the rollers 16 run in the beams engaging the inner surfaces of their free legs and in such a way that the rollers are enclosed from above and from below by the beams. In a way that will be described more closely below the beams of the carriage 17 will fit in corresponding recesses in the pallets in order to engage the pallets like the forks of a forklift truck and to transport said pallets. For performing this movement the carriage is connected to wires 18 which by means of pulleys 19 at a first motor 20, freely rotating pulleys 23 connected to the outer ends of the arms 13 and pulleys 21 by another motor 22 may be operated in the desired way by means of said motors which preferably are hydraulic motors. In retracting carriage 17 towards table 9, carriage 17 is caused to move upon rollers 16 into an adjacent cut-in portion of recess 9a in the short edge of the table as shown in FIG. 1. The innermost section of the arms is preferably provided with a number of rollers 16 along its length, for properly supporting carriage 17 in its retracted position in recess 9a of the table.

The mode of operation of the arrangement will be described below with reference to the transferring of a workpiece from the pallet changer 1 to a machining position and back. Hereby the housing 11 is placed in such a position that the arms 13 point towards the processing machine 5 and the arms are in a retracted position. The workpiece to be processed in said machine is set-up on a pallet 2 which is brought forward for the transferring to the processing machine by the rotation of the table 9 by means of the above mentioned, not shown, hydraulic motor. During this rotational movement of the pallet towards the intended position the table 9 is in its elevated position, whereby the table 9 may rotate separated from the carriage 17. When the table has assumed the position illustrated by means of full lines of FIG. 1 it is lowered down over the carriage 17 so that the forks of the carriage engage the corresponding recesses in the bottom of the pallet 2. Thus the pallet now rests only on the carriage 17 at a distance above the table 9 (FIG. 2).

At this stage hydraulic fluid is supplied to the telescopic cylinders 13 whereby these are extended into engagement with the recesses 15 of the support means 14. When the telescopic cylinders 13 are extended and anchored in the recesses 15 the hydraulic motors 20 and 22 are activated whereby the carriage 17, by means of the wires 18, is pulled out onto the rollers 16 and is pulled forward to a position shown with dotted lines in FIG. 2 for delivering the pallet 2 onto the processing machine 5. Depending upon the type of processing machine the pallet 2 may then be lifted from the carriage by means of a rising plate in the processing machine or the pallet may be lowered down into a fixture. In the latter case this lowering is achieved due to the fact that the support means 14 is vertically adjustable by means of e.g. a hydraulic cylinder (cylinder 25 in FIG. 2). In this case the telescopic cylinder 13 must naturally also be pivotally attached to the housing 11 in order to permit the lowering down of the pallet into the fixture of the processing machine and to permit lifting of the pallet therefrom after the completed machining, and a stop (not shown) must be provided for engaging the arms in their horizontal position and for preventing further pivoting of the arms downwardly from the horizontal position. Thus, it is understood that the arms are only pivotable upwards from the horizontal position shown in FIG. 1.

When the pallet has been delivered the motors 20 and 22 are reversed whereby the carriage is pulled back over the rollers 16 and into the cut-in portion 9a in the table 9. The telescopic cylinders 13 are then retracted, e.g. counteracting a low constant hydraulic pressure in order to provide a smoother travel, by e.g. blocking the motor 20 and activating the motor 22 whereby the wires 18 that are wound-up simultaneously pull back the telescopic cylinders 13 by means of the pulleys 23 attached to the cylinders 13. When the cylinders 13 have been retracted the table 9 is lifted to its raised position and after that the housing 11 with the telescopic cylinders 13 and table 9 may be rotated for performing desired operations during the machining of the workpiece in the machine 5.

When the machining of this workpiece is finished the arrangement is returned to the same initial position but this time without any pallet at the end of the pallet changer facing the processing machine 5. The telescopic cylinders 13 are extended to engage the recess 15 and the hydraulic motors 20 and 22 are activated for pulling out the carriage 17 onto the rollers 16 and towards the processing machine 5. When the pallet 2 with the workpiece has been repositioned on the carriage, either by lowering the pallet or by raising the carriage as described above, the motors 20 and 22 are reversed and the carriage is pulled back to its position in the cut-in portion in the table 9. Finally, the telescopic cylinders 13 are retracted and after that the workpiece is transferred to the next machining position in a corresponding manner.

FIGS. 3 and 4 illustrate an alternative, preferred embodiment of the transfer means 101 of the invention, and especially illustrates a preferred mounting of the extendable arms 113. As in the embodiment illustrated in FIG. 2 the transfer means is mounted in a base or stand 112 to which coverplates 112a are attached for protecting the hydraulic drive systems which will be discussed more closely below in connection with FIG. 5. In base 112 housing 111 is rotatably journalled, and in housing 111 table 109 is in turn journalled for rotary as well as for vertical movement, and as indicated above the hydraulic systems for driving the housing as well as the table will be discussed below in relation to FIG. 5. For reasons of clarity table 109 has been excluded from FIG. 4.

In the alternative embodiment of FIGS. 3 and 4 the extendable arms 113 are pivotally journalled in a bracket 111a firmly attached, as by welding, to housing 111. Bracket 111a is generally U-shaped in cross-section and is provided with two partitions 111b serving the purpose of strengthening the bracket 111a and forming two longitudinal channels in the bracket for receiving the extendable arms 113. The extendable arms are pivotally journalled to the brackets by means of pins 124 and are provided at such a lateral distance from each other that they extend on either side of housing 111. The arms 113 are provided at a sufficient distance below table 109 to be freely pivotable upwardly by means of the support means (not illustrated in FIG. 3 or 4), but are prevented from pivoting downwardly from the substantially horizontal normal position by means of a stop 111c provided on the bracket 111a and engaging the upper side of the arms in their horizontal position.

With reference to FIG. 5 the hydraulic drive systems for the housing and for the table will now be explained. For reasons of clarity the coverplates 112a of the base 112 have been removed and parts of the base 112 have also been cut away. Moreover table 109 and the extendable arms 113 have only been indicated very schematically with broken lines.

As explained above housing 111 is rotatably journalled in base 112, and preferably this is accomplished by providing for instance a taper roller bearing 130 between the lower end of housing 111 and a bottom plate 112b of the base, this taper roller bearing carrying the thrust loads. The radial loads are preferably carried by a roller bearing 151 between housing 111 and an upper plate 112c of the base 112. To this upper plate 112c a gear ring 131 is attached in such a way that is concentrically surrounds housing 110. By means of a bracket 132 fixed to the outer surface of housing 111, at a distance below the upper plate 112c, a hydralic motor 133 is supported in such a way that a gear 134 attached to the outer end of its output shaft 135 engages the gearring 131. The hydraulic motor may preferably be a hydraulic radial motor (a so called star motor) such as type RMF 300 manufactured by the Italian company Oliostip S.A.S.

It will now be understood that rotation of the housing is accomplished by activating motor 133 due to the fact that when output shaft 135, and gear 134 connected thereto, are rotated gear 134 travels about gearring 131, which in turn causes rotation of housing 111 due to the fixed connection between motor 133 and housing 111.

Inside housing 111 a column 110 supporting table 109 is slidably received in such a way that it acts as a piston inside the cylinder formed by the housing 111. For the purpose of raising and lowering column 110, and thereby table 109, the lowermost portion of housing 111 is provided with a channel 136 for supplying hydraulic fluid from hydraulic reservoir 137 to the space below column 110 in housing 111, by means of conventional pump and valve means (not shown). Inside housing 111 the necessary seals 138 are provided for preventing hydraulic fluid from escaping past column 110. It will now be understood that by supplying hydraulic fluid to passage 136 table 109 may be raised. When table 109 is to be lowered again passage 136 is communicated with hydraulic reservoir 137 so that table 109 wil be lowered by its own weight. The supply and discharge of hydraulic fluid will be controlled by means of a conventional directional valve and will not have to be explained further herein.

In its periphery column 110 is provided with teeth 139 having an axial length exceeding that of the axial movement of column 110 for the purpose of raising and lowering the table 109. The teeth 139 on column 110 cooperate with a gear rack 140 extending through an aperture in housing 111 and connected to the outer ends of the piston rods (not shown) of hydraulic cylinders 141 (see FIGS. 3 and 4) connected with their piston rod ends to housing 111. It will now be understood that gear rack 140 will be shifted back and forth in a direction tangential to column 110, and engaging teeth 139, when hydraulic cylinders 141 are activated in the respective directions. Due to the engagement between gear rack 140 and teeth 139 on column 110, column 110 and table 109 will be rotated independently of housing 111 when gear rack 140 is shifted in either direction. Preferably the hydraulic cylinders are of the kind having adjustable stroke length, whereby the limits of the rotation of table 109 may also be adjusted.

From the above it will now be understood that by means of hydraulic motor 133 housing 111 may be rotated together with table 109 supported therein. During rotation of housing 111 alone column 110 is prevented from rotating in housing 111 by the engagement between teeth 139 and gear rack 140. On the other hand table 109 may be rotated independently of housing 111 when hydraulic cylinders 141 are activated for shifting gear rack 140. It will also be understood that due to the fact that teeth 139 on column 110 have sufficient axial length the engagement between teeth 139 and gear rack 140 will not prevent raising and lowering of column 110 and table 109 by supplying hydraulic fluid to and withdrawing hydraulic fluid from respectively passage 136.

Even if the invention has been described and illustrated herein with reference to a pallet changer in a manufacturing system with machining centers it should be obvious to a man skilled in the art that within the scope of the invention the arrangement may be modified and adapted for use in other manufacturing systems where heavy workpieces need to be transferred e.g. between a transport or storage position and a machining position. As an example of this the solution proposed according to the invention, namely that the distance between e.g. the storage position and the machining position is bridged by means of a pair of telescopic, extendable arms which is their partly or fully extended position engage and are supported by support means, may also be embodied in such a way that the arms with their inner ends are rigidly or pivotally attached directly to the processing machine or the like, and are extendable towards a conveyor belt for directly fetching workpieces therefrom or delivering workpieces thereto. A number of processing machines lined up in a row and equipped in the described way could then be served by a straight conveyor belt, from which the machines fetch workpieces by means of the extendable arms. Consequently the scope of the invention is only determined by means of the enclosed claims.

We claim:

1. Apparatus for moving heavy workpieces to a transfer member from a station or from a transfer member to a station, said apparatus comprising:

a transfer member including a housing, said housing being rotatably journalled in a base and a support table being rotatably journalled in said housing;

a pair of arms one end of which is pivotally coupled relative to said housing, the other end of each of said arms being cantilevered relative to and telescopically extendable from said housing;

a moving means moveably supported upon the arms for moving said workpiece between said transfer member and said station;

a vertically adjustable support means separate from said arms for bridging said arms with said station;

means for extending said arms into engagement with said support means; and means coupled to said support means for raising and lowering said support means so that said pair of arms are pivoted correspondingly upwards and downwards for raising and lowering, respectively, said heavy workpieces relative to said station, when said arms are in engagement with said support means.

2. The apparatus of claim 1 wherein outer ends of telescopic sections of said arms comprise rollers which are journalled and collectively form a transfer path for said moving means.

3. The apparatus of claim 1 wherein outer ends of telescopic sections of said arms comprise rollers which are journalled and collectively form a transfer path, and wherein said moving means is a carriage moveably supported upon said rollers for moving said workpiece between said support table and said station.

4. The apparatus of claim 3 including wires attached to said carriage and to respective motors for moving said workpiece.

5. The apparatus of claim 4 wherein said arms are coupled to single acting hydraulic cylinders whereby said arms are extended by said cylinders and retracted against a constant low hydraulic pressure by blocking one of said motors and using another of said motors to wind up said wires.

* * * * *